United States Patent
Saito et al.

(10) Patent No.: US 9,078,171 B2
(45) Date of Patent: Jul. 7, 2015

(54) WIRELESS COMMUNICATION DEVICE CONTINUOUSLY PERFORMING COMMUNICATION AND METHOD THEREOF

(75) Inventors: Masahiro Saito, Hamamatsu (JP); Tomoyoshi Yokota, Tokyo (JP)

(73) Assignee: KYOCERA Corporation, Kyoto (JP)

( * ) Notice: Subject to any disclaimer, the term of this patent is extended or adjusted under 35 U.S.C. 154(b) by 1306 days.

(21) Appl. No.: 11/914,944

(22) PCT Filed: Apr. 27, 2006

(86) PCT No.: PCT/JP2006/308906
§ 371 (c)(1),
(2), (4) Date: Jan. 22, 2009

(87) PCT Pub. No.: WO2006/126369
PCT Pub. Date: Nov. 30, 2006

(65) Prior Publication Data
US 2009/0213787 A1 Aug. 27, 2009

(30) Foreign Application Priority Data
May 23, 2005 (JP) .................. 2005-150183

(51) Int. Cl.
*H04W 36/00* (2009.01)
*H04W 36/14* (2009.01)
(Continued)

(52) U.S. Cl.
CPC ............ *H04W 36/0011* (2013.01); *H04W 8/26* (2013.01); *H04W 36/14* (2013.01); *H04W 80/04* (2013.01); *H04W 88/06* (2013.01)

(58) Field of Classification Search
CPC .......................... H04W 28/0226; H04W 40/36
USPC ..................... 370/310, 331, 334, 338
See application file for complete search history.

(56) References Cited

U.S. PATENT DOCUMENTS 6,904,029 B2 6/2005 Fors et al.
6,970,459 B1 * 11/2005 Meier ........................... 370/389
(Continued)

FOREIGN PATENT DOCUMENTS

EP 1 585 354 A1 10/2005
JP 2000050337 A 2/2000
(Continued)

OTHER PUBLICATIONS

Japanese language office action dated Jan. 18, 2011 and its English language translation for corresponding Japanese application 2005150183.
(Continued)

*Primary Examiner* — Brandon Renner
(74) *Attorney, Agent, or Firm* — Studebaker & Brackett PC

(57) ABSTRACT

A wireless communication device (10) comprising a first communication portion (36a) that connects to a wide-area wireless communication network; a second communication portion (36b) that connects to a narrow-area wireless communication network; and processing portions (32, 34) that, during communication with a wide-area wireless communication network via the first communication portion (36a), upon detection of a communication area boundary vicinity of the wide-area wireless communication network when communication is performed, perform processing so that the second communication portion (36c) continues performing communication that the first communication portion (36a) is performing.

6 Claims, 4 Drawing Sheets

(51) Int. Cl.
    *H04W 8/26*      (2009.01)
    *H04W 80/04*     (2009.01)
    *H04W 88/06*     (2009.01)

(56) References Cited

U.S. PATENT DOCUMENTS

| | | | |
|---|---|---|---|
| 7,161,914 B2 | 1/2007 | Shoaib et al. | |
| 7,680,081 B2 | 3/2010 | Kamura et al. | |
| 2003/0112803 A1 | 6/2003 | Matsugatani et al. | 370/389 |
| 2003/0235175 A1* | 12/2003 | Naghian et al. | 370/338 |
| 2004/0100923 A1* | 5/2004 | Yam | 370/328 |
| 2004/0146021 A1 | 7/2004 | Fors et al. | |
| 2004/0151136 A1* | 8/2004 | Gage | 370/328 |
| 2004/0193702 A1* | 9/2004 | Osborne et al. | 709/220 |
| 2004/0203789 A1 | 10/2004 | Hammond et al. | |
| 2005/0286470 A1* | 12/2005 | Asthana et al. | 370/331 |
| 2006/0088017 A1* | 4/2006 | Kawai et al. | 370/338 |
| 2006/0089121 A1* | 4/2006 | Elgebaly et al. | 455/410 |

FOREIGN PATENT DOCUMENTS

| | | |
|---|---|---|
| JP | 2001036938 A | 2/2001 |
| JP | 2001-224070 | 8/2001 |
| JP | 2003-189358 | 7/2003 |
| JP | 2003333639 A | 11/2003 |
| JP | 2004180292 A | 6/2004 |
| JP | 2004-200820 | 7/2004 |
| JP | 2004-208001 | 7/2004 |
| JP | 2004221730 A | 8/2004 |
| JP | 2004297426 A | 10/2004 |
| JP | 2004-312346 | 11/2004 |
| JP | 2004-320132 | 11/2004 |
| WO | WO 03/015356 A1 | 2/2003 |
| WO | 2004057903 A1 | 7/2004 |
| WO | WO 2004/099348 A2 | 11/2004 |
| WO | 2005015938 A1 | 2/2005 |

OTHER PUBLICATIONS

Korean language office action dated Aug. 31, 2012 and its English language translation issued in corresponding Korean application 20077027206.

Japanese language office action dated Jul. 3, 2012 and its English language translation issued in corresponding Japanese application 2005150183.

Japanese language office action dated Dec. 6, 2011 and its English language translation issued in corresponding Japanese application 2005150183.

\* cited by examiner

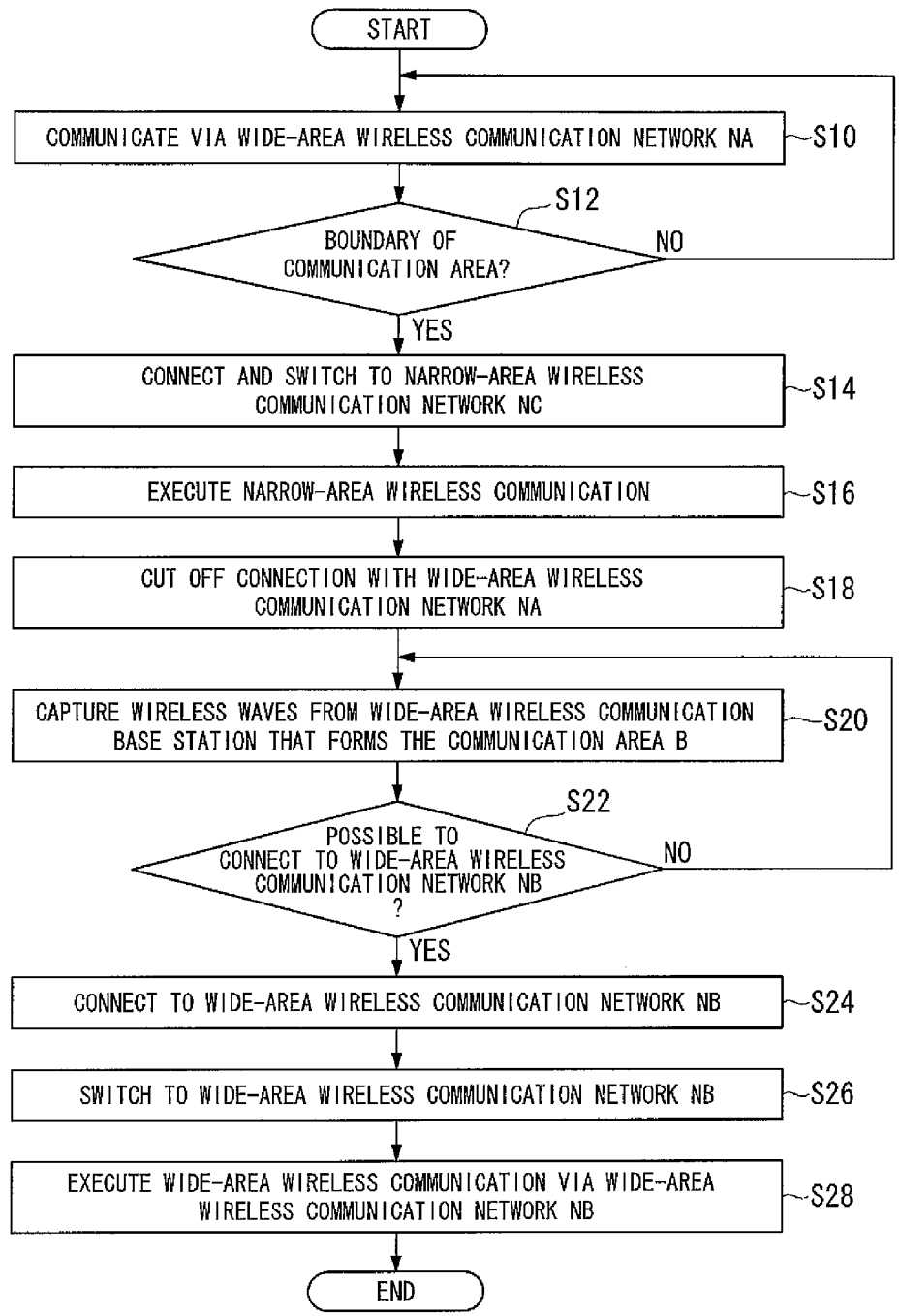

WIRELESS COMMUNICATION DEVICE CONTINUOUSLY PERFORMING COMMUNICATION AND METHOD THEREOF

BACKGROUND OF THE INVENTION

1. Field of the Invention

The present invention relates to a wireless communication device that performs communication by wireless.

Priority is claimed on Japanese Patent Application No. 2005-150183, filed May 23, 2005, the content of which is incorporated herein by reference.

2. Description of Related Art

With the increasing functionality of wireless communication devices that use wireless communication networks such as mobile telephones and in-car communication devices, there are some capable of communication by a plurality of communication systems. Using mobile telephones as an example, some are capable of wireless communication using wireless LAN in addition to a wireless communication system for mobile communication. Mobile telephones have a characteristic in which the radius of the service area of a single access point (base station) is around 2 kilometers. Note that with regard to communication speed, the maximum downlink (from the base station to the wireless communication device) speeds of 2.4 Mbps have become attainable.

On the other hand, among wireless LAN systems that perform network connection within a comparatively restricted area by wireless communication via electromagnetic waves or optical signals without using cables, for example, the IEEE802.11b standard enables a maximum communication speed of 11 Mbps, which is faster than the above-mentioned conventional communication system. However, this standard is characterized by the radius of the area of a single access point being 50 to 100 m, which is narrower than the above-mentioned conventional communication system.

Incidentally, in wireless LAN systems, a mobile IP technology has been proposed in which many access points are set up similarly to mobile telephones, and so even if the access point changes, continuous access is possible. In this mobile IP technology, the network is split into a network to which a mobile terminal (mobile node: MN) originally belongs and an external network, with a home agent (HA), which is a router, provided in the network to which the MN originally belongs, and a foreign agent (FA), which is a router, provided in the destination network of the MN. Also, a home address (HoA), which is a fixed IP address that does not rely on an access point, is assigned to the MN, with the HA managing the relationship between the HoA and a Care-of Address (CoA) using the CoA in the visited network.

Here, assuming the MN has moved from the network to which the MN originally belongs, it automatically acquires a CoA in the destination network, and in order to perform correlation between the CoA and the HoA, the MN sends a registration request to the HA via the FA. The HA, upon receiving this registration request, sends an agent advertisement (data containing an IP address and the like) to the MN. When the MN receives this, the position registration of the MN is completed.

Since a correspondent node (CN) appears to be positioned in the network in which the MN originally belongs, it sends data to be sent to the MN to the HA. The HA then encapsulates packets sent to the MN and sends them to the CoA. The FA receives these encapsulated packets, and forwards them to the IP address of the MN. Thereby, continuous access is possible even if the access point changes. Note that, for details of mobile IP technology, Patent Document 1 (Japanese Unexamined Patent Application, First Publication No. 2001-224070) given below should be referred to.

Incidentally, a wireless communication device such as a mobile telephone is based on a dialup connection. The aforedescribed mobile IP technology is technology designed on the premise of movement between communication mediums such as Ethernet (™). Therefore, it is not optimized for a communication system that is based on dialup connections. Also, since the IP packets in the registration request to the HA described above are discarded, there is a possibility of the session being cut off. Further, depending on the communication condition (high error rate, etc), the registration request may take time, leading to the possibility of the session being cut off.

Also, in mobile communication that is generally employed as described above (wide-area wireless communication network), when moving (changing) between different wide-area wireless communication networks, it is necessary to disconnect the dialup connection that is already established, perform dialup in the new wide-area wireless communication network, and reconnect. For example, an information processing device (personal computer or the like) to which is connected a data communication card for a plurality of different wide communication networks performs communication by seamlessly switching between wireless communication networks.

On the other hand, even in the case of movement (change) of different coverage areas within the same wide-area wireless communication network, during movement so as to straddle devices that manage the IP address given to a wireless communication device, similarly to the case of moving between different wide-area wireless communication networks, it is necessary to disconnect the dial-up connection that is already established, perform dialup in the new area, and reconnect.

As above, in the case of movement that straddles the boundaries of the same or different wide-area wireless communication networks, it is necessary to disconnect the dialup connection and establish a new dialup connection. Also, since anywhere from 10 odd to 20 odd seconds are required from disconnecting the dialup connection to completion of the reconnection, there is the problem that communication cannot be performed during this time.

The present invention was achieved in view of the above circumstances, and has as its object to provide a wireless communication device that can continuously perform communication even in the case of movement that crosses the boundary of the same or different types of wide-area wireless communication networks.

SUMMARY OF THE INVENTION

In order to solve the aforementioned problem, the wireless communication device of the present invention is provided with a first communication portion that connects to a wide-area wireless communication network; a second communication portion that connects to a narrow-area wireless communication network; and a processing portion that, during communication with a wide-area wireless communication network via the first communication portion, upon detection of a communication area boundary vicinity of the wide-area wireless communication network when communication is performed, performs processing so that the second communication portion continues performing communication that the first communication portion is performing.

Also, in the wireless communication device of the present invention, while the second communication portion continues performing communication that the first communication portion is performing, the processing portion performs a connection process via the first communication portion to a wide-area wireless communication network that is capable of continuing the communication, and when the first communication portion connects with the wide-area wireless communication network, the processing portion performs processing to continue the communication via the first communication portion.

Moreover, the wireless communication device of the present invention further comprises a third communication portion that connects with a wide-area wireless communication network different from the wide-area wireless communication network that is connected via the first communication portion, in which while the second communication portion continues performing communication that the first communication portion is performing, the processing portion performs a connection process via the third communication portion to a wide-area wireless communication network that is capable of continuing the communication, and when the third communication portion connects with the wide-area wireless communication network, the processing portion performs processing to continue the communication via the third communication portion.

Here, the connection process that is performed via the first communication portion to the wide-area wireless communication network is a dialup connection process.

Also, the connection process that is performed via the third communication portion to the wide-area wireless communication network is a dialup connection process.

According to the present invention, since the narrow-area wireless communication network is formed at the boundary between the first wide-area wireless communication network and the second wide-area wireless communication network, when changing from the first wide-area wireless communication network during connection to the second wide-area wireless communication network, the connection destination is once switched to the narrow-area wireless communication network. Then, the connection process with the destination second wide-area wireless communication network is performed while the connection with the connection (session) in this narrow-area wireless communication network is continued. For this reason, even in the case of the connection processing taking time, it is possible to achieve continuous communication without cut off of the communication (session) occurring.

BRIEF DESCRIPTION OF THE DRAWINGS

FIG. 4 is a flowchart that shows the processing that is performed when a terminal device moves between communication areas A and B.

DETAILED DESCRIPTION OF THE INVENTION

Figure 1:
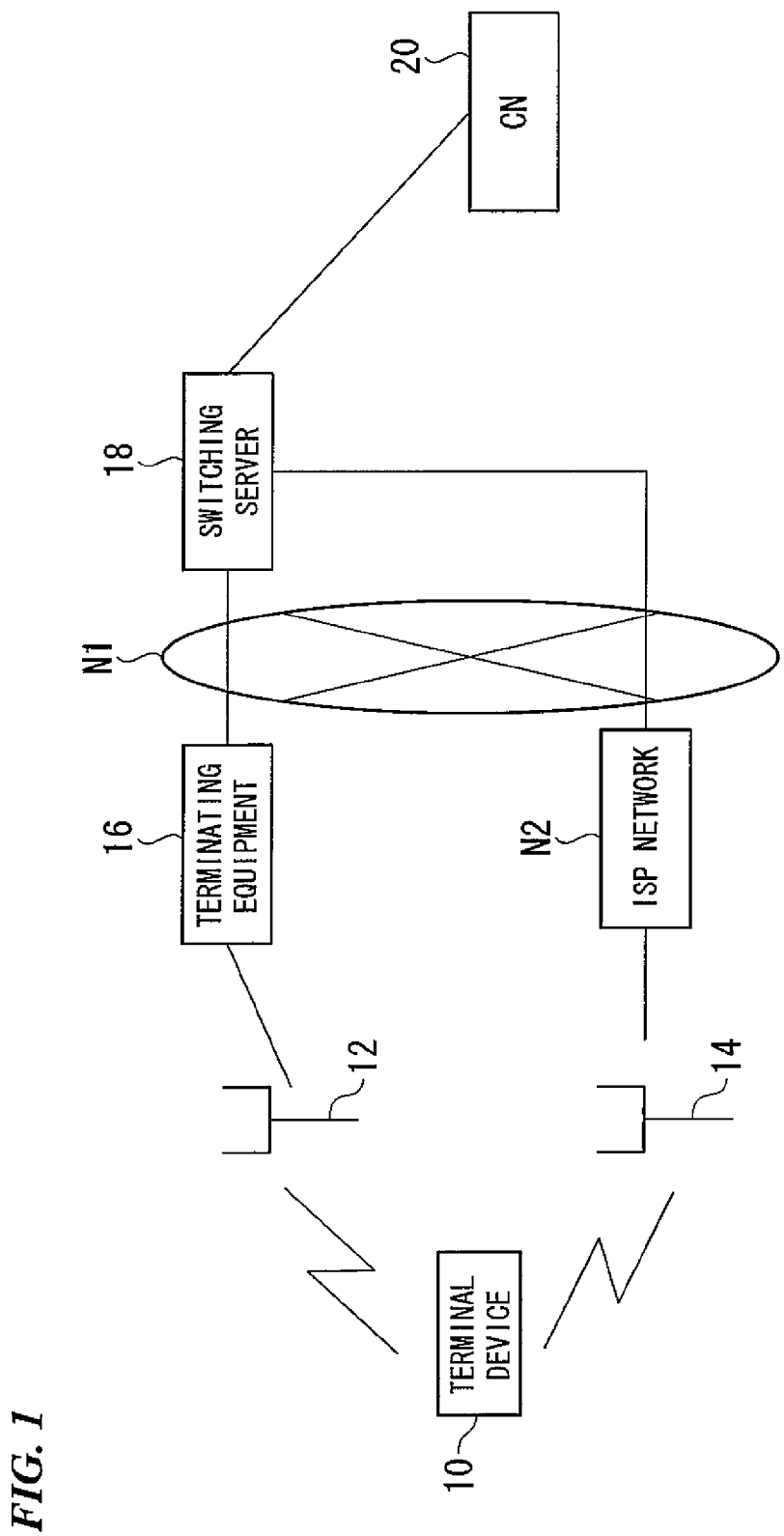
FIG. 1 is a drawing that shows the constitution of the communication system in which the wireless communication device according to one embodiment of the present invention is used.

Hereinbelow, the wireless communication device according to one embodiment of the present invention shall be described in detail with reference to the drawings. FIG. 1 is a drawing that shows the communication system in which the wireless communication device according to one embodiment of the present invention is used. According to FIG. 1, the communication system is constituted to include a wide-area wireless communication base station 12, a narrow-area wireless communication base station 14, a terminating equipment 16, an ISP network N2, a network N1 such as the Internet, and a switching server 18, with communication occurring between a terminal device 10 and a corresponding node (CN) 20.

The terminal device 10 is a wireless communication device such as a mobile telephone that is capable of mobile communication (wide-area wireless communication) and communication by a wireless LAN (narrow-area wireless communication network), realizing wide-area wireless communication by performing transmission/reception of wireless waves with the wide-area wireless communication base station 12, and realizing narrow-area wireless communication by performing transmission/reception of wireless waves with the narrow-area wireless communication base station 14. Note that wide-area wireless communication is communication that uses a network that is provided by the mobile phone service provider, with the radius of the service area of a single access point being approximately 2 km, and the downlink speed reaching a maximum 2.4 Mbps. The terminal device 10 realizes connection to the Internet using wide-area wireless communication by performing a connection process with a dialup connection process. Also, narrow-area wireless communication is communication that uses a network such as a wireless LAN, and includes communication in which the radius of the area of a single access point is approximately 50 to 100 m and the transmission speed is approximately 11 Mbps.

The wide-area wireless communication base station 12 is provided in a plurality at a distance of approximately 4 km with neighboring wide-area wireless communication base stations, and is connected to the terminating equipment. The terminating equipment 16 is, for example, an IP packet terminating equipment such as a packet data serving mode (PDSN), or a terminating equipment for point-to-point (PPP) connection to the Internet, and is connected to the network N1. The narrow-area wireless communication base station 14 is provided at the boundary of the communication area (wide-area wireless communication area) that the wide-area wireless communication base station 12 forms, and is connected to the ISP (Internet service provider) network N2. This ISP network N2 is connected to the network N1.

The switching server 18 is connected to the network N1, and performs switching of communication paths between the terminal device 10 and the corresponding node 20. Although described in detail below, the switching server 18 performs control of the communication path based on a control message that is sent from the terminal device 10 each time the terminal device 10 selects communication via the wide-area wireless communication base station 12 or communication via the narrow-area wireless communication base station 14.

Figure 2:
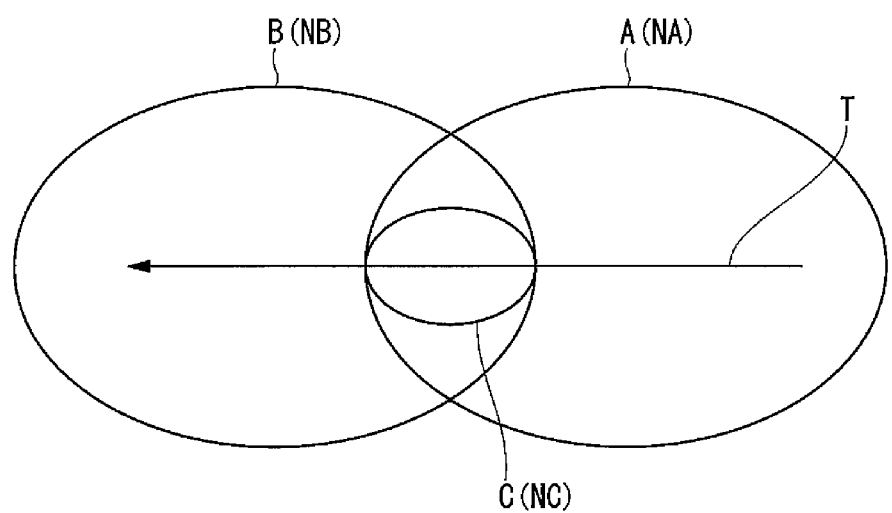
FIG. 2 is a drawing that schematically shows the relationship between the communication area of a wide-area wireless communication base station and a communication area of a narrow-area wireless communication base station.

Here, the positional relationship between the wide-area wireless communication base station 12 and the narrow-area wireless communication base station 14 shall be explained. FIG. 2 is a drawing that schematically shows the relationship between the communication area of the wide-area wireless communication base station 12 and the communication area of the narrow-area wireless communication base station 14. In FIG. 2, the area denoted by reference numeral A is the communication area of a single wide-area wireless communication base station 12, and the area denoted by reference numeral B is the communication area of a neighboring other wide-area wireless communication base station. Also, the area denoted by reference numeral C is the communication area of the narrow-area wireless communication base station 14.

As shown in FIG. 2, the communication area C of the narrow-area wireless communication base station 14 is set at the boundary between the communication area A and the communication area B of the two adjacent wide-area wireless communication base stations. Note that the communication area C need not necessarily be a place where the communication area A and the communication area B overlap. That is, the communication area C need only cover both communication areas of the communication area A and the communication area B.

When the terminal device 10 moves between the communication area A of the single wide-area wireless communication base station 12 and the communication area B of another wide-area wireless communication base station, in the case of a need arising to change the IP address assigned to the terminal device 10, it may not be possible to perform continuous communication. For example, this may be the case when the wide-area wireless communication base station 12 that forms the communication area A and the wide-area wireless communication base station that forms the communication area B are different types of wide-area wireless communication networks. Also, even when the wide-area wireless communication base station 12 that forms the communication area A and the wide-area wireless communication base station that forms the communication area B are included in the same wide-area wireless communication network, when the devices that manage the IP address to be given to the terminal device 10 differ, it may also be necessary to change the IP address.

Here, considering the case of the terminal device 10 moving from the communication area A to the communication area B along a trajectory T shown in FIG. 2, a dialup connection is performed to the other wide-area wireless communication network (communication area B) upon leaving the communication area A of the wide-area wireless communication base station 12. When this happens, since the communication ends up being broken off for the dialup connection, in order to realize a continuous communication, it is necessary to complete the connection process to the destination wide-area wireless communication while the terminal device 10 is positioned in the communication area C that complements the communication area A and the communication area B. Note that since the connection process is performed by dialup in the wide-area wireless communication, between several seconds and several tens of seconds are required for completing the connection process.

In the present embodiment, in order to prevent this situation, the narrow-area wireless communication base station 14 that supplements the continuation of communication during the process of changing the connection between wide-area wireless communication networks is arranged at the boundary between the communication area A formed by the single wide-area wireless communication base station 12 and the communication area B that is formed by a neighboring other wide-area wireless communication base station.

Figure 3:
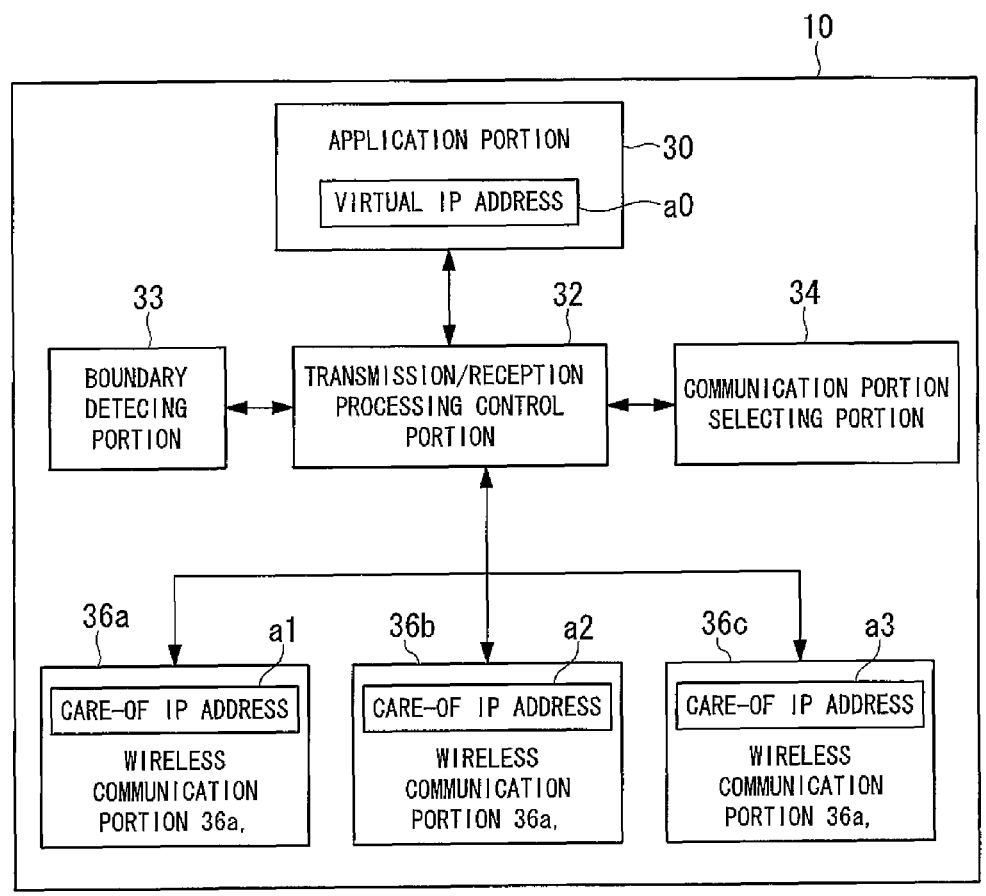
FIG. 3 is a block drawing that shows the main portions of the terminal device as a wireless communication device according to one embodiment of the present invention.

Next, the constitution of the terminal device 10 shall be explained. FIG. 3 is a block diagram that shows the main portion constitution of the terminal device 10 as a wireless communication device according to one embodiment of the present invention. As shown in FIG. 3, the terminal device 10 is constituted to include an application portion 30, a transmission/reception processing control portion 32, a boundary detecting portion 33, a communication portion selecting portion 34, and wireless communication portions 36a, 36b, 36c. The wireless communication portions 36a, 36b, 36c are constituted to include an antenna for wireless communication, a transmission/reception circuit, a signal measuring portion that measures the quality of the received signal (for example, signal qualities such as RSSI, CIR, SIR, and communication speed, etc.) (none being illustrated). Note that in the example shown in FIG. 3, an explanation is given using as an example a constitution in which the terminal device 10 is provided with the three wireless communication portions 36a, 36b, 36c. However, the terminal device 10 may at least be provided with a communication portion that realizes wide-area wireless communication and a communication portion that realizes narrow-area wireless communication.

In the present embodiment, it is assumed that the wide-area wireless communication base station 12 that forms the communication area A and the wide-area wireless communication base station that forms the communication area B shown in FIG. 2 are included in different types of wide-area wireless communication networks. For this reason, the wireless communication portion 36a that is provided in the terminal device 10 performs communication with the wide-area wireless communication base station 12 that forms the communication area A, the wireless communication portion 36b performs communication with the wide-area wireless communication base station 12 that forms the communication area B, and the wireless communication portion 36c performs communication with the narrow-area wireless communication base station 14 that forms the communication area C.

Note that, in the following explanation, the wide-area wireless communication network in which is included the wide-area wireless communication base station 12 that forms the communication area A is called the "wide-area wireless communication network NA", the wide-area wireless communication network in which is included the wide-area wireless communication base station that forms the communication area B is called the "wide-area wireless communication network NB", and the narrow-area wireless communication network in which is included the wide-area wireless communication base station that forms the communication area C is called the "narrow-area wireless communication network NC" (refer to FIG. 2).

When the boundary of a communication area is detected by the boundary detecting portion 33, the transmission/reception processing control portion 32 switches whether communication is performed using which of the wireless communication portions 36a, 36b, 36c based on the selection result of the communication portion selecting portion 34. Also, received data that is received by the wireless communication portions 36a, 36b, 36c is output to the application portion 30, and transmitted data that is output from the application portion 30 is output to the wireless communication portions 36a, 36b, 36c.

The boundary selection portion 33 detects whether the terminal device 10 is positioned at the boundary of a communication area. The boundary detecting portion 33 is provided with map information of the wide-area wireless communication base station 12 and GPS (global positioning system) functionality, and based on the position information of the terminal device 10 obtained by this map information and the GPS function, detects whether or not the terminal device 10 is positioned at the boundary of the communication area. Note that the even with a constitution that provides only the GPS function in the boundary detecting portion 33 and provides the map information in the switching server 18 shown in FIG. 1, it is possible to detect whether or not the terminal device 10 is positioned at the boundary of the communication area.

Also, in the case of the boundary detecting portion 33 not providing the GPS function, it is acceptable to set up a server that sends GPS information to the network N1 so that the boundary detecting portion 33 may obtain GPS information from this server.

Also, besides the above, by setting threshold values of signal qualities such as the RSSI, CIR, SIR, and communication speed, etc. in the boundary detecting portion 33 in advance, when the signal qualities such as the RSSI, CIR, SIR, and communication speed, etc. fall below the threshold values, it is also possible for the boundary detecting portion 33 to detect that the terminal device 10 is positioned at the boundary of the communication area.

The communication portion selecting portion 34 performs the process of selecting which of the wireless communication portions 36a, 36b, 36c is to be used for communication in consideration of the communication band (throughput or communication speed) measured by the wireless communication portions 36a, 36b, 36c, wireless state, and communication cost, etc. The application portion 30 processes the received data that is output from the transmission/reception processing control portion 32 and outputs it to a speaker or display device (illustrations of both omitted) that is provided in the terminal device 10, and outputs a signal based on operation of an operation key (illustration omitted), data to be sent to the corresponding node 20, etc. to the transmission/reception processing control portion 32.

The terminal device 10 in the present embodiment is constituted to be capable of simultaneous communication with at least two of the wide-area wireless communication base stations that form the communication area A and the communication area B and the narrow-area wireless communication base station 14 that forms the communication area C in order to realize continuous communication at the boundary with the communication area A and the communication area B shown in FIG. 2.

For this reason, at least two of a care-of IP address a1 for performing communication via the wide-area wireless communication network NA, a care-of IP address a2 for performing communication via the wide-area wireless communication network NB, and a care-of IP address a3 for performing communication with the narrow-area wireless communication network NC are simultaneously assigned to the terminal device 10. These care-of IP addresses a1, a2, a3 are assigned by server devices (not illustrated) that are provided in the wide-area wireless communication networks NA and NB and the narrow-area wireless communication network NC. Note that these server devices are identical to an HA in mobile IP technology.

Also, a virtual IP address a0 that the application portion 30 uses in advance is assigned to the terminal device 10. In the case of the application portion 30 performing sending of data, the IP address of the destination becomes necessary, and in the case of performing receiving of data, the IP address of the destination IP address becomes necessary. In the present embodiment, by setting the virtual IP address a0 as the IP address that the application portion 30 uses, even in the case of the care-of IP address that is used frequently changing as a result of the network that the terminal device 10 is actually using changing, consistent communication is possible without altering the process of the application portion 30. Note that the virtual IP address a0 is not one that shows the actual sending destination/sending source IP address, being an IP address that is used only in the terminal device 10.

The aforementioned transmission/reception processing control portion 32 performs a conversion process with the virtual IP address a0 that the application portion 30 uses and with the care-of IP addresses a1, a2, a3 that are assigned to the terminal device 10, and outputs the received data that the wireless communication portions 36a, 36b, 36c have received to the application portion 30 and outputs the send data to be output from the application portion 30 to the wireless communication portions 36a, 36b, 36c.

Next, the process that is performed by the communication system and the terminal device 10 when the terminal device 10 moves from the communication area A to the communication area B shown in FIG. 2 shall be explained. FIG. 4 is a flowchart that shows the process that is performed when the terminal device 10 moves between the communication areas A and B. First, the terminal device 10 is positioned in the communication area A, and is put in communication with the corresponding node 20 via the wide-area wireless communication base station 12 that forms the communication area A (step S10). At this time, the wireless communication portion 36a is selected by the transmission/reception processing control portion 32 of the terminal device 10, and the care-of IP address a1 is assigned to the terminal device 10 by the server device that is provided in the wide-area wireless communication network NA.

During this communication, the boundary detecting portion 33 of the terminal device 10 periodically detects whether the terminal device 10 is positioned at the boundary of the communication area A, and the detection result is output to the transmission/reception processing control portion 32. The transmission/reception processing control portion 32, based on the detection result of the boundary detecting portion 33, determines whether or not the terminal device 10 is positioned at the boundary of the communication area A (step S12).

In the case of this determination result being "NO", the process returns to step S10, and the communication is continued.

On the other hand, when the determination result of step S12 is "YES", the transmission/reception processing control portion 32 selects the wireless communication portion 36c, and thereby the process of switching with the connection to the narrow-area wireless communication network NC is performed (step S14). Specifically, when the transmission/reception processing control portion 32, based on the selection result of the communication portion selecting portion 34, selects the wireless communication portion 36c, the authentication process between the terminal device 10 and the server device of the narrow-area wireless communication network NC and the assigning of the care-of IP address a3 are performed via the narrow-area wireless communication base station 14 that is included in the narrow-area wireless communication network NC. Note that for a system that comprehensively manages wide-area wireless communication networks and narrow-area wireless communication networks, by concluding the authentication process etc. to a narrow-area wireless communication network through a wide-area wireless communication network during communication, it is possible to expedite connection to the narrow-area wireless communication network.

Also, when the wireless communication portion 36c is selected by the transmission/reception processing control portion 32, a control message to that effect is sent from the terminal device 10 to the switching server 18 shown in FIG. 1.

Upon receiving this control message, the switching server 18 switches the communication path between the terminal device 10 and the corresponding node 20 to a path via the narrow-area wireless communication base station 14. By the above processing, the switching process with the connection to the narrow-area wireless communication is completed.

When the above processing is completed, narrow-area wireless communication is performed between the terminal device 10 and the corresponding node 20 (step S16). However, since the connection with the wide-area wireless communication network NA is not cut off, the reception of packets that have been sent to the care-of IP address a1 in the terminal device 10 is continuously performed. When a predetermined time elapses following the end of the processing of step S14, the transmission/reception processing control portion 32 of the terminal device 1 cancels the selection of the wireless communication portion 36a, and thereby the connection with the wide-area wireless communication network NA is cut off (step S18).

Next, wireless waves from the wide-area wireless communication base station that forms the communication area B are captured by the wireless communication portion 36b of the terminal device 10 (step S20). Then, the transmission/reception processing control portion 32 determines whether it is possible to connect to the wide-area wireless communication network NB by the captured wireless waves (step S22). Note that the transmission/reception processing control portion 32 performs the aforementioned determination based on the selection result of the communication portion selecting portion 34.

In the case of the determination result being "NO", the processing returns to the process of step S20. On the other hand, in the case of the determination result of step S22 being "YES", the transmission/reception processing control portion 32 selects the wireless communication portion 36b, and thereby a dialup connection to the wide-area wireless communication network NB is performed (step S24). In this dialup connection processing, the authentication process between the terminal device 10 and the server device of the wide-area wireless communication network NB, and the assigning of the care-of IP address a2 are performed via the wide-area wireless communication base station that is included in the wide-area wireless communication network NB.

Also, when the wireless communication portion 36b is selected by the transmission/reception processing control portion 32, a control message to that effect is sent from the terminal device 10 to the switching server 18 shown in FIG. 1. Upon receiving this control message, the switching server 18 switches the communication path between the terminal device 10 and the corresponding node 20 to a path via the wide-area wireless communication base station that is included in the wide-area wireless communication network NB (step S26). However, the reception of packets that are notified to the care-of IP address a3 in the terminal device 10 is continuously performed. When the aforementioned processing is completed, wide-area wireless communication is performed between the terminal device 10 and the corresponding node 20 via the wide-area wireless communication network NB (step S28).

As explained above, in the present embodiment, the communication area C of the narrow-area wireless communication is set at the boundary of the communication area A of the wide-area wireless communication. Then, when the terminal device 10 moves between the communication areas A and B, narrow-area wireless communication for complementing continuation of communication during the processing to change connections between wide-area wireless communication networks at the boundary of the communication area A, and dialup connection processing to the destination wide-area wireless communication network is performed while narrow-area wireless communication is being performed. For this reason, even in the case of time being required for the dialup connection processing, it is possible to achieve continuous communication without breaks in communication occurring. Note that the reason for establishing the narrow-area wireless communication network for complementing the continuation of communication during the process of changing connections between wide-area wireless communication networks is that it is possible to be constituted at a lower cost at the required locations than establishing base stations at wide-area wireless communication networks at a higher cost for complementing.

Note that in the aforedescribed embodiment, an explanation was given using as an example the case of two care-of IP addresses being assigned at once to the terminal device 10 and communication via the wide-area wireless communication network NA and the narrow-area wireless communication network NC being performed in parallel, or communication via the wide-area wireless communication network NB and the narrow-area wireless communication network NC being performed in parallel. However, even in the case of three care-of IP addresses being assigned at once to the terminal device 10 and communication being performed in parallel via the wide-area wireless communication networks NA, NB and the narrow-area wireless communication network NC, conflict-free communication is possible by suitable switching of the communication paths.

Also, in the aforedescribed embodiment, an explanation was given using as an example the case of the wide-area wireless communication network NA and the wide-area wireless communication network NB being different types of networks. However, even if these networks are the same network, it is possible to achieve continuous communication by the same processing. Note that in the case of the same network, constitution is possible with one wireless communication portion for wide-area wireless communication networks.

INDUSTRIAL APPLICABILITY

The present invention is suitably applicable to a wireless communication device that uses a wireless communication network, such as a mobile telephones or in-car communication device, that can perform continuous communication even in the case of movement that straddles the boundaries of the same or different wide-area wireless communication networks.

What is claimed is:

1. A wireless communication device comprising:
 a first communication portion that connects to a first wide-area wireless communication network;
 a second communication portion that connects to a narrow-area wireless communication network;
 a processing portion that, during communication with the first wide-area wireless communication network via the first communication portion, upon detection of a communication area boundary vicinity of the first wide-area wireless communication network when communication is performed, performs processing so that the second communication portion performs communication after concluding an authentication process to the narrow-area wireless communication network through the first wide-area wireless communication network during communication; and
 a third communication portion that connects with a second wide-area wireless communication network different from the first wide-area wireless communication network that is connected via the first communication portion, wherein a first communication area of the narrow-area wireless communication network is at a boundary between a second communication area of the first wide-area wireless communication network and a third communication area of the second wide-area wireless communication network.

2. The wireless communication device according to claim 1, wherein while the second communication portion continues performing communication that the first communication portion is performing, the processing portion performs a connection process via the third communication portion to the second wide-area wireless communication network that is capable of continuing the communication, and when the third communication portion connects with the second wide-area wireless communication network, the processing portion performs processing to continue the communication via the third communication portion.

3. The wireless communication device according to claim 2, wherein the connection process that is performed via the third communication portion to the second wide-area wireless communication network is a dialup connection process.

4. The wireless communication device according to claim 1, wherein the connection with the first wide-area wireless communication network is not cut off while the processing portion performs the processing.

5. A method of continuously performing communication, the method comprising:
   communicating with a first wide-area wireless communication network;
   connecting with a second wide-area wireless communication network different from the first wide-area wireless communication network;
   detecting of a communication area boundary vicinity of the wide-area wireless communication network when the communication is performed; and
   processing so that the communication is performed after concluding an authentication process to the narrow-area wireless communication network through the first wide-area wireless communication network during communication,
   wherein a first communication area of the narrow-area wireless communication network is at a boundary between a second communication area of the first wide-area wireless communication network and a third communication area of the second wide-area wireless communication network.

6. The method of continuously performing communication according to claim 5, wherein the connection with the wide-area wireless communication network is not cut off while the processing is performed.

* * * * *